United States Patent Office 3,431,116
Patented Mar. 4, 1969

3,431,116
PROCESS FOR THE PRODUCTION OF CONFECTIONERY FATS
Reuben O. Feuge, Norman V. Lovegren, and Betty B. Gajee, New Orleans, La., assignors to the United States of America as represented by the Secretary of Agriculture
No Drawing. Filed Aug. 5, 1965, Ser. No. 477,621
U.S. Cl. 99—118                 7 Claims
Int. Cl. A23d 5/02; A23g 1/00

ABSTRACT OF THE DISCLOSURE

This invention relates to a process for producing confectionery fats using as a starting material the stearine fraction obtained in the solvent winterization of cottonseed oil. The process of the invention comprises the steps of selectively hydrogenating cottonseed oil stearine to accomplish the conversion of the linoleic acid groups of the cottonseed oil stearine to oleic acid groups, the hydrogenation being carried out without the concurrent production of trans-isomers and subsequent to the hydrogenation the removal of saturated glycerides from the selectively hydrogenated product via a fractional crystallization.

A non-exclusive, irrevocable, royalty-free license in the invention herein described, throughout the world for all purposes of the United States Government, with the power to grant sublicenses for such purposes, is hereby granted to the Government of the United States of America.

This invention relates to the production of confectionery fats. More specifically, it relates to a process for the production of cocoa butter-like fats from the stearine fraction obtained in the solvent winterization of cottonseed oil and to the products so produced.

The confectionery industry in the United States uses annually several hundred million pounds of cocoa fat in the form of chocolate and cocoa butter. The latter is also used in sizable amounts in pharmaceuticals and cosmetics. Other fats having some of the properties of cocoa butter are used in frozen confections. The relative proportions in which the cocoa fat (cocoa butter) and the non-fat portions of the cocoa bean are used in chocolate and chocolate-type products ensure a built-in shortage of cocoa butter. This built-in shortage also makes cocoa butter an expensive product, and it must be imported with a consequent outflow of dollars to foreign countries.

For many years cocoa butter-like fats have been manufactured from other natural oils and fats. Almost invariably these cocoa butter-like fats have lacked one or more of the prized physical properties of cocoa butter. These properties include a glossy appearance and a hard, brittle structure at room temperature, an extremely short melting range of about 50 to 95° F. and rapid melting in the mouth when the fat is eaten.

Cocoa butter-like fats prepared heretofore usually have been quite incompatible with cocoa butter; that is, mixing one with the other resulted in a significant depression of the melting and softening points and a large increase in the proportion of liquid phase.

It is an object of the present invention to produce cocoa butter-like fats which possess to a high degree the prized physical properties of cocoa butter, including hardness at room temperature and a short melting range.

Another object of the invention is to produce a cocoa butter-like fat having a high degree of compatibility with cocoa butter.

Still another object is to provide a process for making good cocoa butter-like fats from the relatively inexpensive stearine fraction produced when cottonseed oil is subjected to solvent winterization in the commercial production of salad oil.

These and other objects and advantages of the present invention will become apparent from the detailed description set forth herein below Cocoa butter owes its prized melting characteristics and other valuable properties to the fact that it is composed mostly of just a few types of triglycerides which in some respects are so much alike that their mixture behaves somewhat like a pure compound. Cocoa butter has essentially the following composition, expressed in terms of mole percentages:

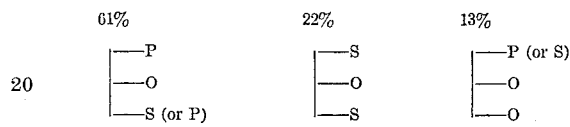

Where the structure E represents the glycerol moiety, and P, S, and O represent palmitoyl, stearoyl, and oleoyl groups, respectively. The palmitoyl and stearoyl groups are to a high degree equivalent in these triglycerides. The two-position of these triglycerides is occupied almost entirely by oleic acid groups (cis-isomers). The oleic acid groups in the two-position are an important characteristic which makes possible a linear contraction of up to 2% when properly handled cocoa butter is solidified in molds. This contraction occurs when the solidified components of cocoa butter undergo a polymorphic transformation from the next-to-highest to the highest melting forms. Similar glycerides in which the oleic acid groups are in the 1-position do not contract to the desired degree on solidification in molds and do not demold properly.

As will be discussed more fully below, cocoa butter contains four general types of triglycerides as follows:

Trisaturated which will be designated herein as s-s-s wherein s may be palmitoryl or stearoyl groups; s-s-s is present to the extent of about three weight percent.

Monounsaturated which will be designated herein as s-u-s or 2-unsaturated wherein s has the same meaning as above and u is mostly the oleoyl group; s-u-s is present to the extent of about 80 weight percent. It should be understood that some of these monounsaturated triglycerides may be u-s-s and/or s-s-u. However, s-u-s triglycerides predominate and accordingly these monounsaturated triglycerides will be referred to herein as 2-unsaturated triglycerides.

Diunsaturated which will be designated herein as s-u-u or 2,3-unsaturated triglycerides, where s and u have the same meaning as above. The s-u-u is present to the extent of about 13 weight percent. Again, it will be understood that some of these diunsaturated glycerides may be present as u-s-u. However, s-u-u groups predominate and accordingly these diunsaturated triglycerides will be referred to herein as 2,3-unsaturated triglycerides.

Triunsaturated (1,2,3-unsaturated) which will be designated herein as u-u-u, and u is mostly oleoyl. The u-u-u is present to the extent of about 1 weight percent.

It should be remembered that the composition of cocoa butter as described above is a close approximation. Actually, the composition of cocoa butter varies somewhat from sample to sample, and small amounts of triglycerides and of fatty acids other than those indicated may be present. For example, the fatty acids of cocoa butter usually contain 2–3% linoleic acid. Many attempts have been made to produce cocoa butter-like fats. For example, socalled "hard butter" is manufactured from palm kernel stearine, palm kernel oil, and coconut oil. These hard butters have been and are still being used extensively in place of cocoa butter. Their content of 40–50% lauric acid groups is conducive to a short melting range and a melting point below about 37° C. However, confectionery fats derived from lauric acid oils have several disadvantages. (1) They are relatively incompatible with cocoa butter, which is usually present in confections because cocoa powder contains from 10–20% fat. (2) A palm kernel stearine having about the same melting point and liquid content as cocoa butter, 33.2° C. and 20% liquid fat at 20° C. has been found to yield with cocoa butter a 1:1 mixture melting at 29.0° C. and containing 30% liquid at 20° C. (3) When lauric acid oils in confections undergo a slight hydrolysis, a shaarp soapy flavor results; and when such confections are eaten a burning sensation is produced in the throat.

Some animal fats contain a sizable proportion of oleopalmitostearins, and it has been proposed at various times that these stearins be isolated by fractional crystallization and used as cocoa butter-like fats. For good reasons, such products have never been successful commercially. Isolating the oleopalmitostearins from the numerous other types of triglycerides present has been so difficult and expensive as to be economically not feasible. Also, the oleopalmitostearins from animal fats mostly have a saturated acid group in the two-position, and hence these stearins do not exhibit the desired contraction on molding and have other undesirable physical properties.

For somewhat similar reasons a cocoa butter-like fat prepared in our laboratory and consisting mostly of oleo- and dioleotriglycerides of palmitic and stearic acids was deemed unsuitable for commercialization, even though the melting range, melting point, and iodine value almost duplicated those of cocoa butter. This product was prepared by the random interesterification of a palmitodistearin product and a triolein product followed by fractional crystallization from a solvent.

At one time in our laboratory a cocoa butter-like fat was prepared by hdrogenating cottonseed oil to an iodine value between 20–30 and then isolating in 20–40% yield a fraction possessing to a fair degree the properties of cocoa butter. The yield obviously was lower than desired, and the properties of the cocoa butter-like fat differed somewhat from those of cocoa butter because of the unavoidable content of a sizable amount of iso-oleic acid groups. These groups consist mostly of trans-isomers of the oleic acid group. Glycerides of the trans-isomers of oleic acid are much higher melting than are the glycerides of oleic acid (cis-isomers). Triolein melts at 5.5° C. while trielaidin melts at 42° C.

Prior to the present invention, it has generally been believed that good cocoa butter-like fats could not be made from cottonseed oil if a partial hydrogenation was involved in their production. The conditions used in the commercial hydrogenation of cottonseed oil to shortening-like products always produce large proportions of iso-leic acid groups. As one example, the hydrogenation of cottonseed oil under selective conditions (0.20% nickel, as catalyst, a temperature of 200° C., a hydrogen pressure of 5 p.s.i.g., and a low rate of hydrogen dispersion) produced 37.9% of trans-isomers, calculated as trielaidin, by the time the iodine value had been reduced to 62.3 and practically all of the linoleoyl groups had been reduced to groups of lower unsaturation. Under some selective conditions of hydrogenation practically one iso-oleic acid (trans-isomer) group is formed for each linoleic acid group hydrogenated. In addition, when most of the linoleic acid groups have been hydrogenated, the oleic acid groups originally present will be rapidly isomerized to trans-isomers of oleic acid until a trans-cis equilibrium ratio of approximately 67:33 is attained. In addition to trans-isomers, cis-isomers of oleic acid also are formed extensively under ordinary conditions of hydrogenation.

The presence of significant amounts of iso-oleic acid groups (trans-isomers) in fats to be used in the preparation of cocoa butter-like fats not only increases the proportion of high-melting triglycerides to be avoided in the cocoa butter-like fats, but also increases greatly the different types of triglycerides present and tends to yield cocoa butter-like fats deficient in hardness and brittleness at room temperature, and deficient in compatibility with cocoa butter.

The present invention is the result of several discoveries made in our laboratory. On examining a commercial stearine produced as a byproduct in the manufacture of salad oil by the solvent winterization of refined and bleached cottonseed oil, it was discovered that this stearine was an almost ideal starting material for the manufacture of cocoa butter-like fats, provided a means could be found for converting linoleic acid groups selectively into oleic acid groups without producing large proportions of iso-oleic acid groups.

We have now found that cocoa butter-like fats may be synthesized from stearine, produced as a byproduct in the manufacture of salad oil by the solvent winterization of refined and bleached cottonseed oil, by converting linoleic acid groups selectively into oleic acid groups and its isomers without producing large proportions of trans-isomers. This conversion is accomplished by a particular selective hydrogenation of stearine and the subsequent removal of the s-s-s fraction of undesirable saturated triglycerides by fractional crystallization.

The cottonseed oil stearine used in our process is a byproduct of the commercial production of salad oil by the solvent winterization of refined and bleached cottonseed oil. In essence the cottonseed oil is mixed with a light petroleum naphtha (usually a commercial hexane) to form a solution containing about 40 to 50% oil by weight. This solution is then cooled in the course of several hours to a temperature between about 0 and 4° F. (−17.8 and −15.6° C.) and then passed through a centrifuge operated at about the same temperature to remove the solid stearine.

Methyl esters of the fatty acid roups in a typical stearine were analyzed by gas-liquid chromatography and found to have the following composition:

| Ester: | Weight percentage |
| --- | --- |
| Myristate | 0.2 |
| Palmitate | 52.4 |
| Stearate | 2.1 |
| Oleate | 9.6 |
| Linoleate | 35.8 |

A sample of this stearine was subjected to lipase hydrolysis, the monoglycerides (mostly 2-monoglycerides) obtained were isolated, and the fatty acid groups from the monoglycerides were converted into their methyl esters. Analysis of the latter by gas-liquid chromatography indicated that over 90% of the acyl groups in the 2-position of the original stearine were unsaturated. This is almost exactly the percentage found for cocoa butter when it is analyzed by the same procedure. The iodine value of the stearine was 72.4. On the basis of the iodine value, fatty acid composition, and lipase hydrolysis data it can be calculated that this sample of stearine from the solvent winterization of cottonseed oil consisted of 70% 1,3-dipalmito-2-unsaturated triglyceride and 30% 1-palmito-2,3-unsaturated triglycerides, the unsaturated acid groups in both triglycerides being oleic and linoleic. Analysis of a sample from another large lot of stearine revealed that it consisted of about 64% 1,3-dipalmito-2-unsaturated triglycerides and 36% 1-palmito-2,3-unsaturated triglycerides.

When the triglyceride composition of the stearine and cocoa butter are expressed in terms of saturated and unsaturated acid groups, the similarity of the two fat products is immediately apparent. Cocoa butter has the following composition:

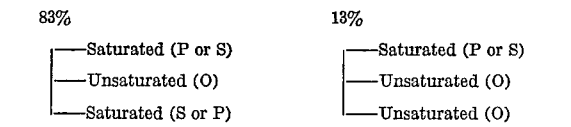

Where P, S, and O represent palmitoyl, stearoyl, and oleoyl groups, respectively. For convenience, as noted above, these groups will be referred to as s-u-s and s-u-u, respectively.

The stearine has the following composition:

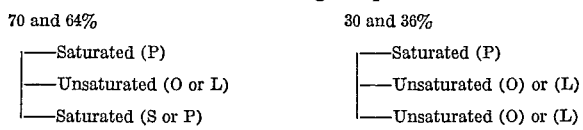

where P, S, and O have the same meaning as above and L is linoleoyl. These, likewise, will be referred to as s-u-s and s-u-u, respectively.

As noted above, the stearoyl and palmitoyl groups in these triglycerides are generally equivalent. Therefore, to convert stearine to cocoa butter-like fats the process must meet three requirements: (1) convert the linoleoyl into oleoyl groups and its cis-isomers; (2) hydrogenate some of theoleoyl groups and its isomers to stearoyl groups; (3) suppress the formation of trans-isomers of the oleoyl groups. As noted above, typical hydrogenations have been unsuccessful, particularly in the third requirement as about 37.9% trans-isomers were formed resulting in a marked increase of the melting point of the hydrogenated product and it was commercially unacceptable.

For the preparation of good cocoa butter-like fats from the stearine, the presence of approximately 30 to 36% of 1-palmito-2,3-unsaturated triglycerides in the stearine is particularly fortunate. Good cocoa butter-like fats depend on a proper blend of s-u-s and s-u-u triglycerides to simulate the melting characteristics of cocoa butter. Because hydrogenation is a random reaction insofar as a given type of unsaturated acyl group is concerned, it is apparent that the ratio of s-s-u and s-u-s to s-u-u triglycerides will increase as hydrogenation proceeds. Complicating this hydrogenation is the increase of the s-s-s triglycerides. It is an advantage of the process of our invention that these s-s-s triglycerides may be removed by a fractional crystallization from a suitable solvent, such as a petroleum naphtha or acetone. This will be discussed more fully below.

In experimenting with procedures for hydrogenating linoleic acid groups without producing large amounts of trans-isomers it was discovered that certain nickel-catalysts are highly active, highly selective, and yet do not produce large amounts of trans-isomers. One such product is the commercially available zirconium-promoted nickel catalyst marketed as Gridler Catalyst G-70 by the Chemetron Chemicals Division of the Chemetron Corporation, Louisville, Ky.

When a highly active and highly selective catalyst which normally does not produce large proportions of trans-isomers is used at a temperature below 100° C. and preferably at a temperature just high enough for it to hydrogenate the cottonseed oil stearine at a rate which reduces the iodine value 10 to 30 units per hour, the reaction product will have a trans-isomer content about one-third that produced by ordinary hydrogenation.

For such hydrogenation the petroleum naphtha used in manufacturing the cottonseed oil stearine need not be removed. Indeed, under some conditions the presence of the petroleum naphtha is desirable because it permits the hydrogenation to be conducted at an even lower temperature, which results in an even lower content of trans-isomers.

Frequently, the cottonseed oil stearines contain unwanted impurities which interfere with the hydrogenation reaction, particularly if a reaction at a very low temperature is desired. Therefore, it is a critical feature of the process of our invention that the cottonseed oil stearine alone, or in petroleum naphtha solution be bleached with an adsorbent, such as a neutral, activated clay, just prior to conducting the hydrogenation.

The nature of the hydrogenation process which forms an integral part of our invention can be further defined by a description of the preparation of hydrogenated products HP-1, HP-2, and HP-3.

To obtain hydrogenated products HP-1, HP-2, and HP-3, the hydrogenations were conducted in heptane solution (1:1 by weight) at a temperature of about 84° C. (180° F.) at a hydrogen pressure of 22 p.s.i.g. The zirconium-promoted nickel catalyst was used at a level of 0.25% nickel, based on the weight of stearine. The reactions were conducted in a Parr Series 4,500 Pressure Reaction Apparatus. The total weight of the charge was 2.45 lbs. The content of trans-isomers in the reaction product was measured using Method Cd 14-61 of the American Oil Chemists' Society, except that the content of trans-isomers found was corrected by subtracting the content of trans-isomers found in the stearine used as starting material, which was 3.12%. It has since been established by us and others that the method of the American Oil Chemists' Society will show three or more percent trans-isomers in triglycerides when none are present. The analytical data for the hydrogenated products are recorded in Table I.

TABLE I.—DATA ON PRODUCTS PREPARED BY HYDROGENATION OF COTTONSEED OIL STEARINE EO-46

| Product | Iodine value | Trans-isomers, percent | Composition of derived methyl esters, wt. percent | | | | |
|---|---|---|---|---|---|---|---|
| | | | Myristate | Palmitate | Stearate | Oleate | Linoleate |
| Orig. Stearine | 72.4 | 0.0 | 0.2 | 52.4 | 2.1 | 9.6 | 35.8 |
| HP-1 | 36.2 | 10.2 | 0.2 | 51.4 | 10.3 | 35.2 | 2.9 |
| HP-2 | 40.9 | 10.6 | 0.2 | 50.2 | 8.0 | 35.2 | 6.4 |
| HP-3 | 29.3 | 10.7 | 0.2 | 50.0 | 14.1 | 34.8 | 0.8 |

From these data it is evident that the linoleic acid content of the hydrogenated products has decreased to about the level found in cocoa butter when the iodine value reaches about 36 in the course of the hydrogenation. Therefore, an iodine value of 36 would be about the upper limit for making cocoa butter-like fats. The lower limit is determined by the ratio of monounsaturated (s-u-s) to diunsaturated (s-u-u) triglycerides desired, and the amount of unwanted trisaturated (s-s-s) glycerides which the operator can afford to discard. For practical purposes the lower limit of the iodine value is about 25.

In the discussion that follows concerning the selectively hydrogenated products, lower case letters will be used to identify the types of fat. Thus, trisaturated glycerides will be designated s-s-s; 2-unsaturated glycerides will be designated s-u-s; 2,3-unsaturated glycerides will be designated s-u-u and triunsaturated glycerides will be designated u-u-u. As noted above, there will be some u-s-s and s-s-u present in the 2-unsaturated triglycerides as well as some u-u-s- and some u-s-u present in the 2,3-unsaturated triglycerides.

The proportion of the several types of triglycerides in hydrogenated product HP-3 and in cocoa butter was determined by means of chromatography using a column of silicic acid and silver nitrate. The following proportions were found:

| Type of fat (triglyceride) | Product HP-3, percent | Cocoa butter, percent |
|---|---|---|
| Trisaturated, s-s-s | 21 | 3 |
| Monounsaturated, s-u-s | 66 | 83 |
| Diunsaturated, s-u-u | 12 | 13 |
| Triunsaturated, u-u-u | 1 | 1 |

Thus, it is evident that hydrogenated product HP-3 differed from cocoa butter mainly in that it contained 21% trisaturated s-s-s glycerides instead of 3%.

It was discovered that most of the s-s-s component of hydrogenated product HP-3 and similar products could be removed by dissolving the products in petroleum naphtha (commercial pentane in the case cited below), about 1:1 by weight, allowing the solution to cool overnight to room temperature (about 75° F.), cooling the solution to 68° F. and holding it at that temperature for an additional six hours, and then separating by filtration the lipid phase containing the cocoa butter-like fat. The fat was recovered from the filtrate fraction by evaporating the petroleum naphtha. In Table II are recorded data on the cocoa butter-like fractions obtained. Cocoa butter-like fat HP-1F was obtained from hydrogenated fat HP-1, etc.

TABLE II.—COCOA BUTTER-LIKE FATS OBTAINED BY FRACTIONAL CRYSTALLIZATION OF HYDROGENATED PRODUCTS

| Cocoa Butter-Like Fat | Actual yield, percent | Corr. yield,[a] percent | Iodine value | Trans-isomers, percent |
|---|---|---|---|---|
| HP-1F | 56.5 | | 41.4 | 10.7 |
| HP-2F | 65.6 | | 45.8 | 10.2 |
| HP-3F | 48.7 | 69.0 | 37.9 | 11.6 |

[a] Yield if all of filtrate had been collected.

For practical purposes, good results are obtained when the naphtha solution in contact with solid fat is cooled to and maintained at 15–25° C. (59–77° F.) for about four to eight hours.

It is an advantage of our invention that the melting points of the cocoa butter-like fats can be lowered by lowering the temperature of the fractional crystallization. A fractional crystallization at 15° C. (59° F.) can be made to yield a cocoa butter-like fat melting completely at 35° C. (95° F.). The solvent fractionation also is not limited to the use of petroleum naphtha. We found acetone to be even better than petroleum naphtha insofar as the physical properties of the cocoa butter-like fats are concerned. Acetone is more expensive to use, and its use under certain circumstances makes the practice of our invention more cumbersome.

It is a further advantage of our invention that it can readily be integrated with other processes currently used in the manufacture of cottonseed salad oil. Thus, the crushed cottonseed can be extracted with petrolum naphtha, the resulting miscella can be refined with alkali and bleached with an adsorbent, the resulting solution of petroleum naphtha and purified oil can be winterized, the stearine from the winterization (which already contains some petroleum naphtha) can be diluted with an additional amount of petroleum naphtha, then the resulting solution can be hydrogenated, and the hydrogenated solution then can be fractionally crystallized to obtain the cocoa butter-like fat.

It is a still further advantage of the process of our invention that the hydrogenated stearine may be fractionated to obtain a cocoa butter-like fat by removing the solvent used in the hydrogenation step, solidifying the stearine, and then tempering the stearine by alternately raising and lowering the temperature, preferably between 60° and 86° F., then forcing the tempered stearine through an orifice to break up the crystal structure and then leaching the stearine with an equal weight of petroleum naphtha or acetone. If desired, the tempering can be accomplished by the procedure described in U.S. Patent 3,170,799.

In Table III are recorded the liquid content-temperature data obtained on examining samples of cocoa butter-like fats after tempering to convert the various components into their highest melting forms insofar as possible.

TABLE III.—PERCENTAGE OF LIQUID IN COCOA BUTTER-LIKE FATS AND COCOA BUTTER AT VARIOUS TEMPERATURES

| Temp., °F. | Liquid content, percent | | | |
|---|---|---|---|---|
| | HP-1F | HP-2F | HP-3F | Cocoa Butter |
| 50 | | 3 | 2 | |
| 59 | | 6 | 3 | 7 |
| 68 | 5 | 18 | 3 | 11 |
| 77 | 12 | 28 | 10 | 17 |
| 86 | 30 | 56 | 32 | 36 |
| 95 | 70 | 78 | 60 | 100 |
| 104 | 94 | 96 | 90 | |
| 122 | 100 | 100 | 100 | |

The melting characteristics of cocoa butter-like fats represented in Table III are such that they are good cocoa butter-like fats. Melting points somewhat above that of cocoa butter are desirable for some uses, particularly if the fats are to be consumed in the summertime.

In Table IV are shown the melting characteristics of three cocoa butter-like fats obtained by leaching samples of a hydrogenated stearine (HP-14, iodine value 31.7) with an equal weight of commercial hexane after tempering the stearine to convert, insofar as possible, the various components into their highest melting polymorphs.

TABLE IV.—LIQUID CONTENT OF COCOA BUTTER-LIKE FATS, OBTAINED ON FRACTIONATING HYDROGENATED STEARINE HP-14 AT VARIOUS TEMPERATURES, AND OF COCOA BUTTER

| Temp., °F. | Liquid content, percent | | | |
|---|---|---|---|---|
| | Cocoa butter | Cocoa butter-like Fat obtained at— | | |
| | | 59° F. | 68° F. | 77° F. |
| 50 | | | 1 | 1 |
| 59 | 7 | 4 | 4 | 4 |
| 68 | 11 | 14 | 12 | 11 |
| 77 | 17 | 26 | 18 | 17 |
| 86 | 36 | 51 | 30 | 29 |
| 95 | 100 | 99 | 79 | 63 |
| 104 | | | 100 | 91 |

The three cocoa butter-like fats are identified by the leaching temperature, thus the 59° fat was the cocoa butter-like fat obtained when the hydrogenated stearine was leached at 59° F., etc. Leaching produces about the same yield of cocoa butter-like fat as does fractional crystallization using the same type and amount of solvent at the same temperature.

An important advantage of our invention is the conversion of the components of the hydrogenated stearine into their highest melting polymorphs insofar as possible. Each of these components can exist in several polymorphic forms, and each form has a definite melting point and solubility. Obviously, an unwanted, trisaturated (s-s-s) component cannot be removed effectively from a slurry of liquid and solids if the component is present in three or four forms, each having a different solubility. Converting the components of a hydrogenated stearine into their higher melting polymorphs also unscrambles mixed crystals of trisaturated (s-s-s) and monounsaturated (s-u-s) triglycerides. Such mixed crystals may form extensively but can be unscrambled by tempering to effect polymorphic transformations. This is shown in Table V.

TABLE V.—INFLUENCE OF THERMAL HISTORY ON THE MELTING OF HYDROGENATED FAT HP-14

| Temp., °F. | Liquid content, percent | |
|---|---|---|
| | Partially-tempered Sample | Well-tempered Sample |
| 68 | 7 | 6 |
| 77 | 9 | 13 |
| 86 | 13 | 33 |
| 95 | 23 | 46 |
| 104 | 37 | 56 |
| 113 | 52 | 63 |
| 122 | 70 | 70 |

The tempering operation unscrambled the mixed crystals so that the percentage melted increased over the temperature range of 77° to 113° F.

Hardness indices were determined for the cocoa butter-like fats. Fat HP-3F approached cocoa butter quite closely in hardness, in fact the hardness of this sample was almost identical to that of cocoa butter over the temperature range of 68° to 91° F.

Cooling curves for the cocoa butter-like fats also were determined. All behaved like cocoa butter in that the temperature dropped to a minimum value and then rose. Fat HP-3F exhibited a temperature rise of 7.4° compared to 9.0° F. (5.0° C.) for cocoa butter. This rise in a cooling curve is important because it indicates the cocoa butter-like fats possess the solidification characteristics which will permit them to perform satisfactorily in machinery designed for making chocolate. As noted above, one of these characteristics is proper mold release, which depends upon a polymorphic transformation after solidification.

Another important advantage of the confectionery fats of our invention is their compatibility with cocoa butter, which means that the addition of these confectionery fats to cocoa butter should not depress the melting or softening point of the latter, or increase its percentage of liquid phase. Cocoa butter-like fat HP-3F was highly compatible. The maximum softening point depression of the confectionery fats of our invention was only one or two tenths of a degree. Some commercial hard butters give a softening point deperssion 10 to 15 times as great.

Experimental coating compositions were prepared with cocoa powder and several of the cocoa butter-like fats prepared according to the process of our invention. These coatings, when molded well above the temperature used for chocolate, could be molded readily after solidification, and the molded surfaces possessed good gloss. Bloom did not develop during the limited storage test. The eating qualities of the coating compositions were judged to be commercially acceptable.

We claim:
1. A process for producing confectionary fat consisting of the following operations performed in sequence:
  (a) bleaching cottonseed oil stearine which stearine is composed essentially of 2,3-unsaturated triglycerides (s-u-u) and 2-unsaturated triglycerides (s-u-s) in which the unsaturated acyl groups are predominantly linoleic, and also some trisaturated glycerides (s-s-s);
  (b) hydrogenating the bleached cottonseed oil stearine to an iodine value of about from 25 to 36, employing conditions of temperature and pressure together with a hydrogenation catalyst adapted to accomplish the conversion of linoleic acid groups in the cottonseed oil stearine to acid groups having a lower degree of unsaturation while maintaining the amount of iso-oleic acid groups as measured by trans-bond content below about 12 weight percent based on the weight of total stearine, while also producing a minimum amount of additional trisaturated glycerides (s-s-s);
  (c) dissolving the selectively hydrogenated stearine in an organic solvent selected from the group consisting of hexane, heptane, higher boiling petroleum naphtha and acetone;
  (d) partially crystallizing the trisaturated glycerides (s-s-s) present from the resulting solution;
  (e) tempering the crystallized trisaturated glycerides (s-s-s) from step (d) while in contact with the solution to convert these trisaturated glycerides to their highest melting polymorphic forms;
  (f) removing the tempered, high-melting polymorphs from the solution of the cocoa butter-like fats; and thereafter,
  (g) evaporating the solvent to recover the cocoa butter-like products useful as confectionery fats.

2. A process according to claim 1 wherein the selective hydrogenation operation is carried out with a zirconium-promoted nickel catalyst at a temperature not greater than about 100° C. until the iodine number of the hydrogenated product is reduced to about 36.

3. The process according to claim 2 wherein the stearine is dissolved in an equal weight of a solvent selected from the group consisting of hexane, pentane, and petroleum naphtha prior to the selective hydrogenation operation.

4. A process according to claim 1 wherein the selectively hydrogenated stearine comprises about 21 weight percent trisaturated glycerides, 66 weight percent 1- and 2-unsaturated triglycerides, 12 weight percent, 1,2-unsaturated triglycerides and 1 weight percent triunsaturated glycerides.

5. A process according to claim 3 wherein the selectively hydrogenated stearine comprises about 21 weight percent trisaturated glycerides, 66 weight percent 1- and 2-unsaturated triglycerides, 12 weight percent 1,2-unsaturated triglycerides and 1 weight percent triunsaturated glycerides.

6. A process according to claim 1 wherein the selectively hydrogenated stearine is tempered to produce the highest melting polymorphs and the trisaturated glycerides are removed by leaching the tempered stearine with about an equal weight of a solvent selected from the group consisting of petroleum naphtha, pentane, hexane, and acetone and thereafter, separating the liquid phase containing the desirable confectionery fats from the trisaturated glycerides by filtration.

7. A process according to claim 1 wherein the selectively hydrogenated and fractionated product comprises about 80 weight percent 1- and 2-unsaturated triglycerides (u-s-s-) and (s-u-s) about 12 weight percent 1,2-unsaturated triglycerides (u-u-s) and has a melting range from about 59° to 95° F.

References Cited
UNITED STATES PATENTS

| | | | |
|---|---|---|---|
| 2,898,211 | 8/1959 | Barsky et al. | 99—118 |
| 2,903,363 | 9/1959 | Farr | 99—118 |
| 3,105,844 | 10/1963 | Toyama et al. | 260—409 |
| 3,084,049 | 4/1963 | Sennema | 99—118 |

MAURICE W. GREENSTEIN, *Primary Examiner.*

U.S. Cl. X.R.

99—23